(12) United States Patent
Curello et al.

(10) Patent No.: US 8,905,373 B2
(45) Date of Patent: *Dec. 9, 2014

(54) NON-INTERCHANGEABLE CONNECTING VALVES FOR FUEL CARTRIDGES

(71) Applicant: Societe BIC, Clichy Cedex (FR)

(72) Inventors: Andrew J. Curello, Hamden, CT (US); Paul Spahr, New Haven, CT (US)

(73) Assignee: Societe BIC, Clichy Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/032,966

(22) Filed: Sep. 20, 2013

(65) Prior Publication Data

US 2014/0021390 A1    Jan. 23, 2014

Related U.S. Application Data

(63) Continuation of application No. 12/674,205, filed as application No. PCT/US2008/073868 on Aug. 21, 2008, now Pat. No. 8,561,965.

(60) Provisional application No. 60/957,362, filed on Aug. 22, 2007.

(51) Int. Cl.
*F16L 37/28* (2006.01)
*H01M 8/04* (2006.01)
*C01B 3/06* (2006.01)
*H01M 8/10* (2006.01)

(52) U.S. Cl.
CPC ...... *H01M 8/04082* (2013.01); *H01M 8/04208* (2013.01); *C01B 3/06* (2013.01); *H01M 8/1011* (2013.01); *Y02E 60/523* (2013.01)
USPC .................. 251/149.1; 137/595; 137/614.03

(58) Field of Classification Search
CPC ...... H01M 8/04201; F16L 37/34; F16L 37/36
USPC ............... 137/595, 613, 614, 614.03, 614.05; 251/149, 149.1, 149.6, 149.7
See application file for complete search history.

(56) References Cited

U.S. PATENT DOCUMENTS

| | | | |
|---|---|---|---|
| 5,464,042 A * | 11/1995 | Haunhorst | 137/595 |
| 7,174,914 B2 * | 2/2007 | Ooishi et al. | 137/614.03 |
| 8,028,718 B2 * | 10/2011 | Tiberghien et al. | 137/614.03 |
| 8,561,965 B2 * | 10/2013 | Curello et al. | 251/149.1 |
| 2003/0020040 A1 * | 1/2003 | Anderson | 251/149.1 |
| 2006/0174952 A1 | 8/2006 | Curello et al. | |
| 2008/0272128 A1 | 11/2008 | Norimatsu et al. | |
| 2009/0233150 A1 * | 9/2009 | Takahashi et al. | 429/34 |

OTHER PUBLICATIONS

Extended European Search Report issued in connection with the corresponding European Patent Application EP 08 79 8373 on Mar. 3, 2014.

* cited by examiner

*Primary Examiner* — John K Fristoe, Jr
*Assistant Examiner* — Reinaldo Sanchez-Medina
(74) *Attorney, Agent, or Firm* — The H.T. Than Law Group

(57) ABSTRACT

A non-interchangeable two-component connecting valve capable of connecting a fuel supply to a fuel cell or other device is disclosed. One component of the connecting valve comprises at least one center post and one internal elastomeric seal, which opens when moved or compressed by a correctly sized and dimensioned mating tube from the other component. In one embodiment, only one valve component has one or more internal seals. In alternate embodiments, both valve components have one or more internal seals, which can open simultaneously or sequentially.

20 Claims, 12 Drawing Sheets

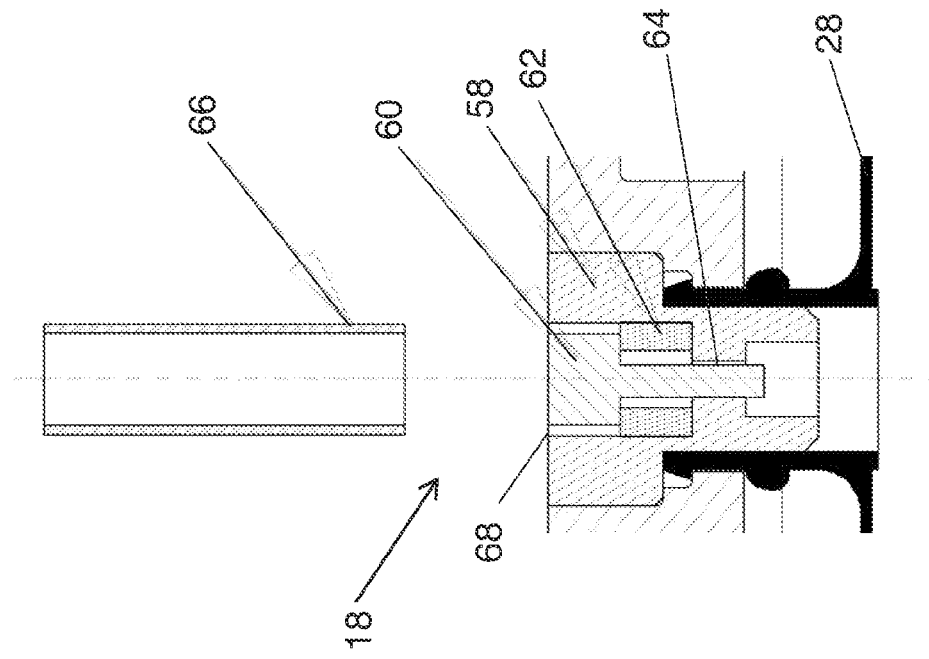
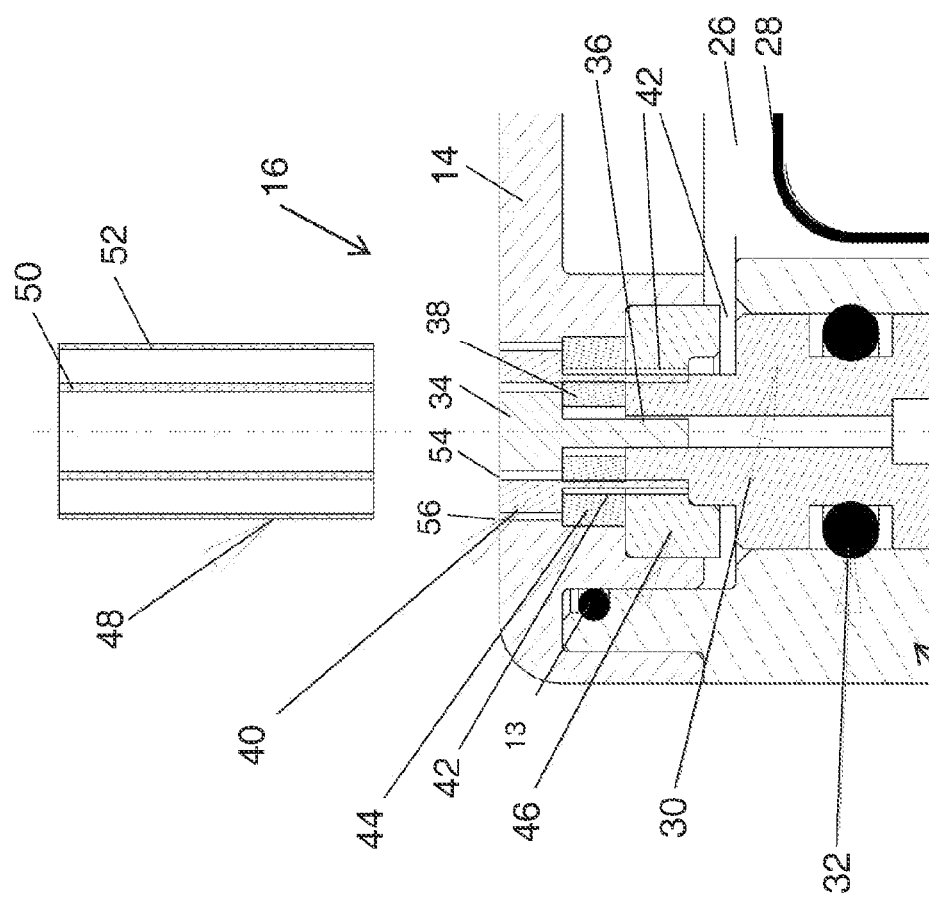
FIG. 6
FIG. 5

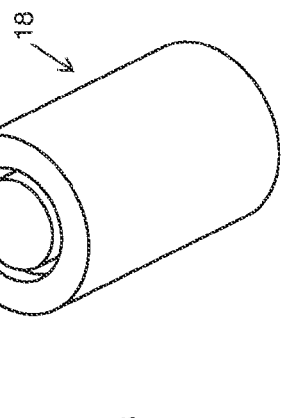
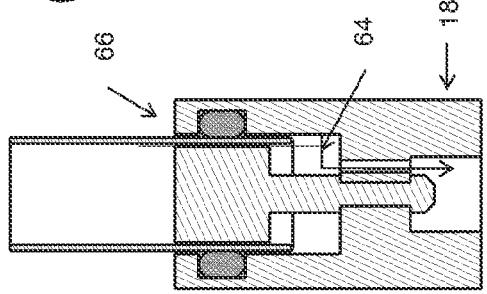
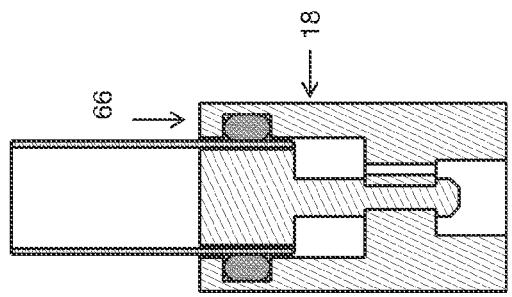
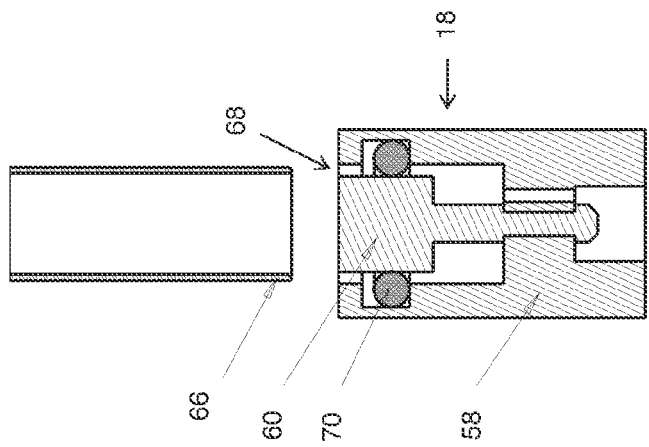

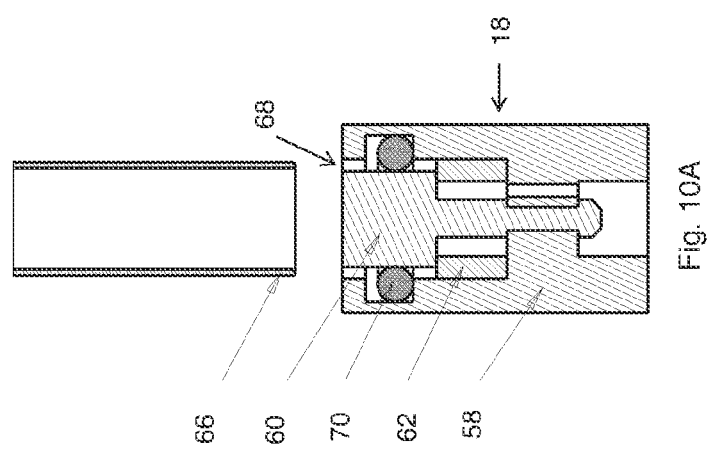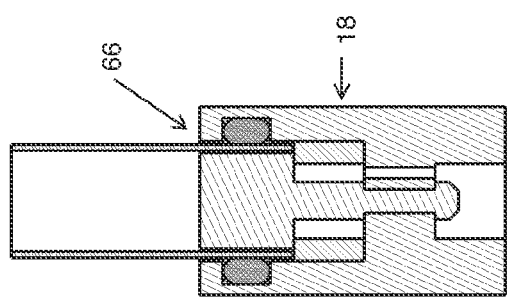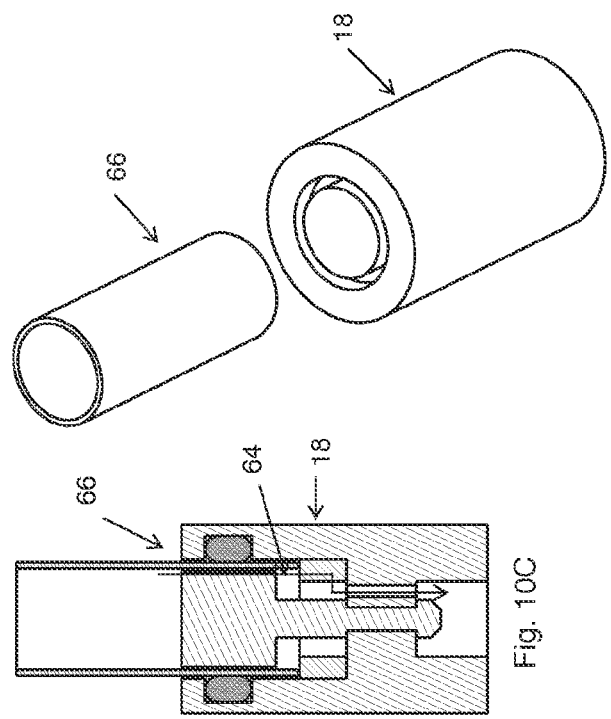

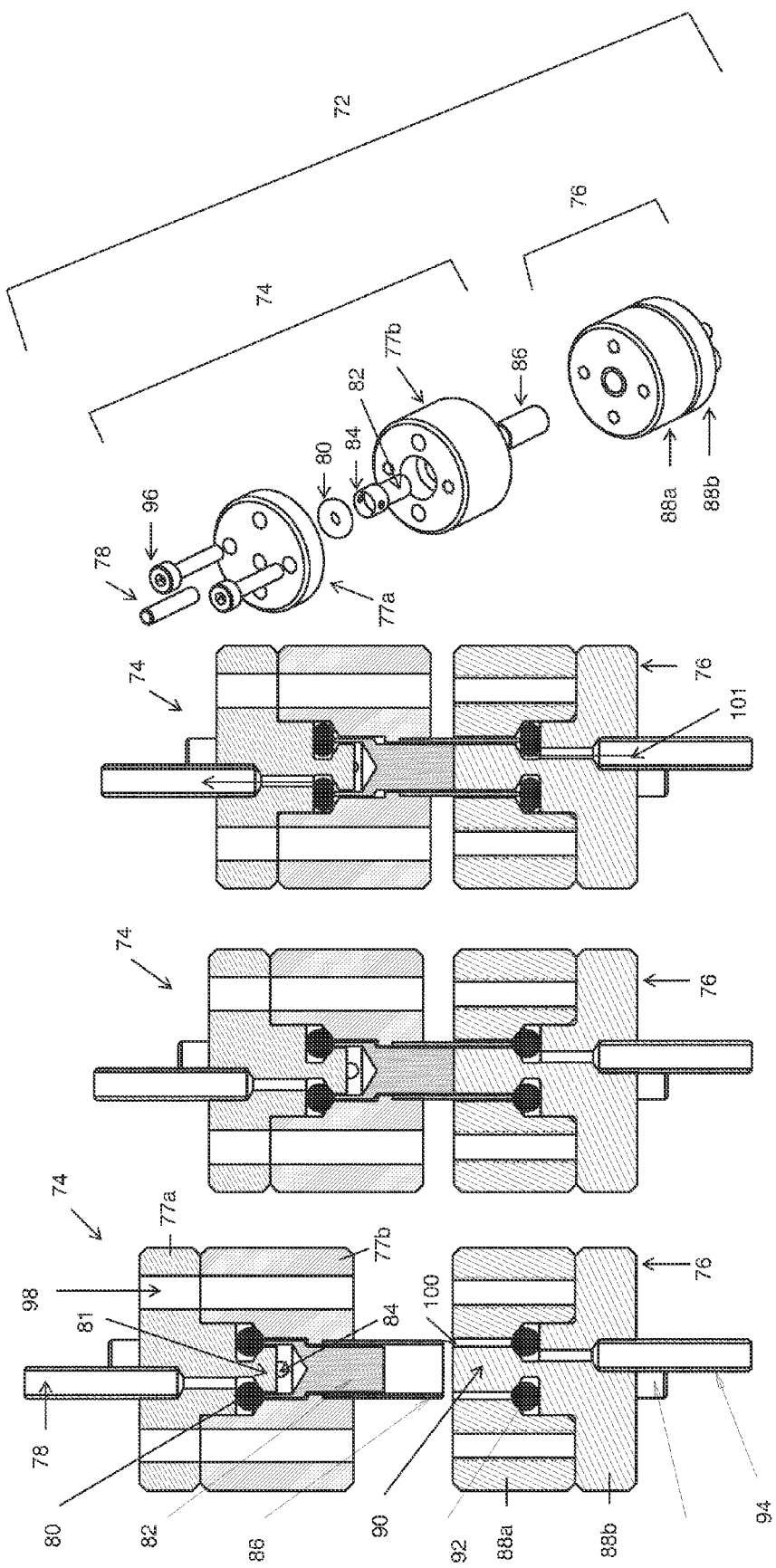

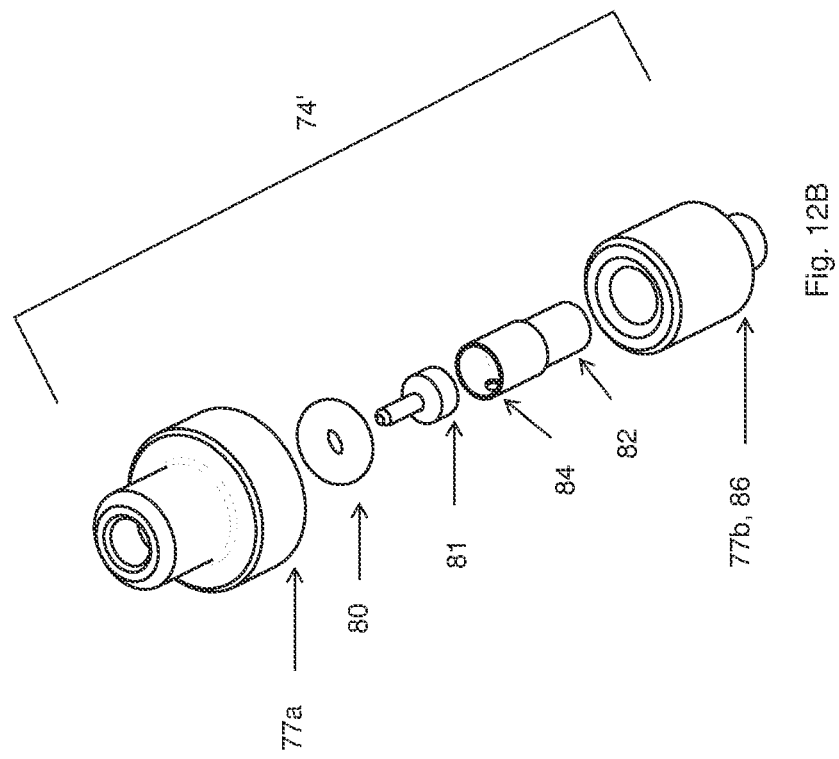
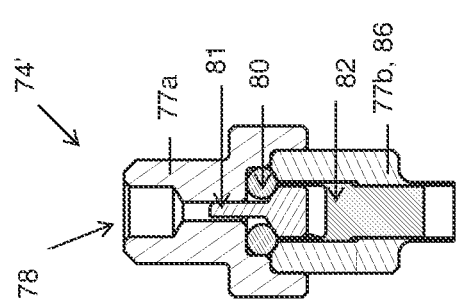

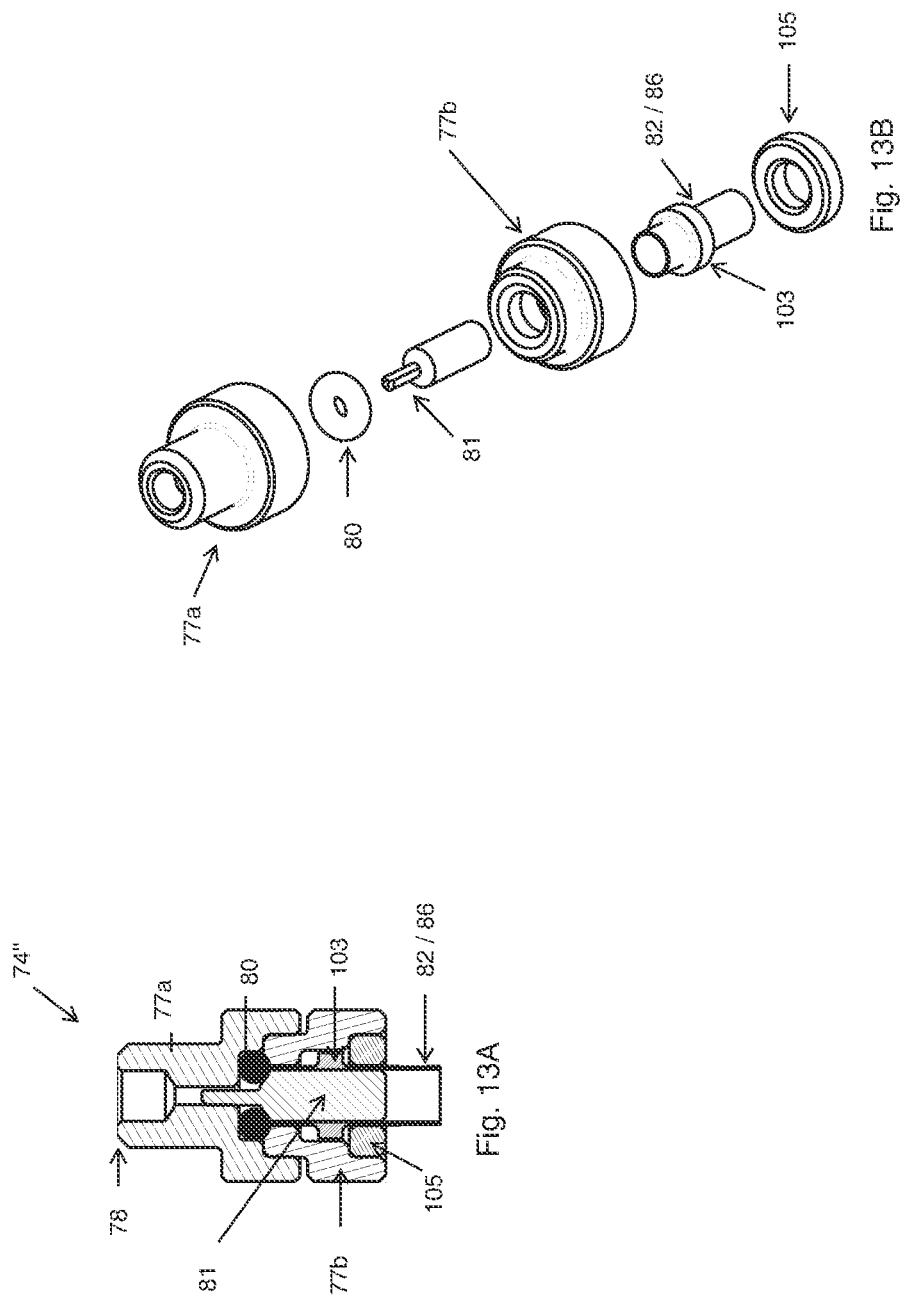

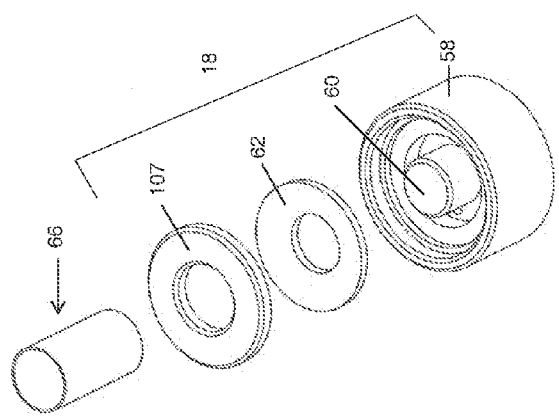
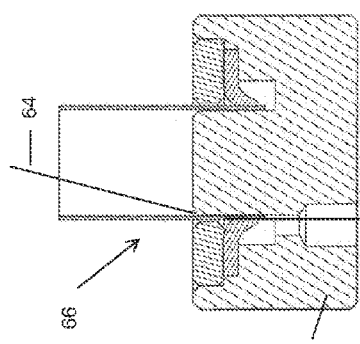
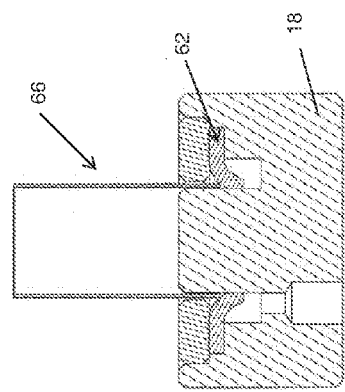
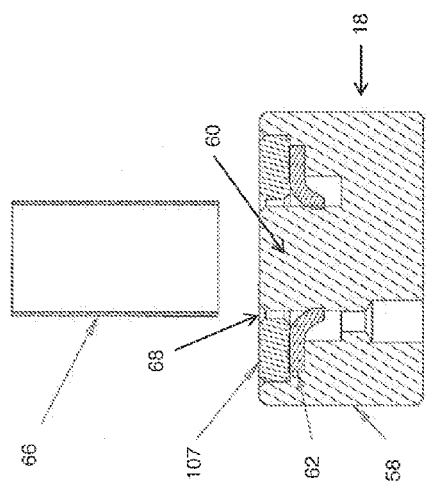

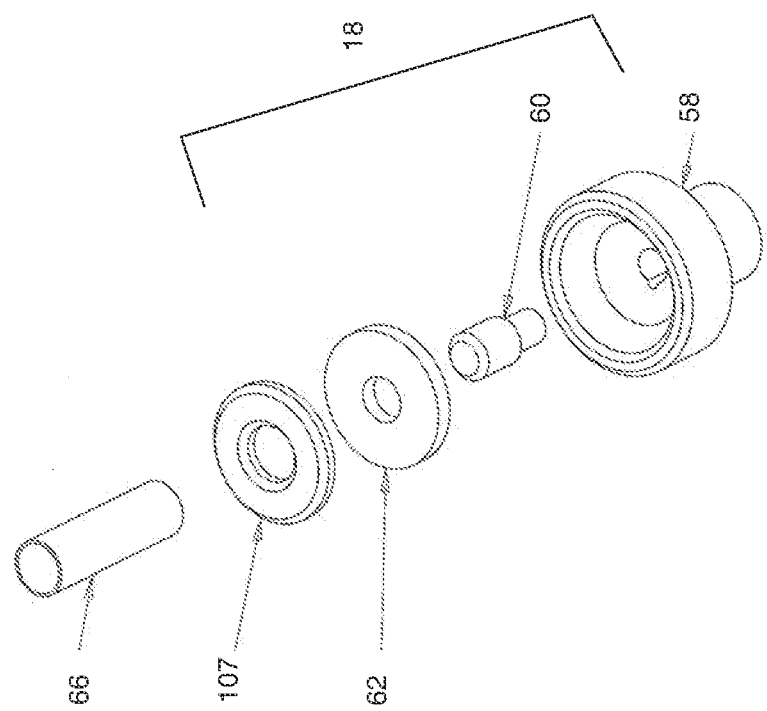
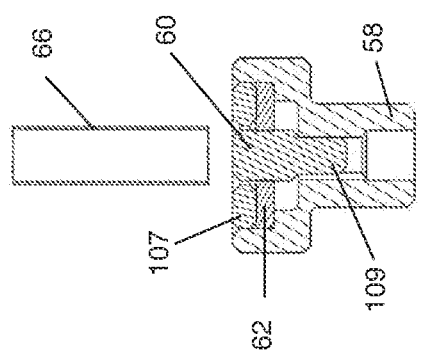

NON-INTERCHANGEABLE CONNECTING VALVES FOR FUEL CARTRIDGES

The present application is a continuation of U.S. patent application Ser. No. 12/674,205, which was filed on Feb. 19, 2010, and issued as U.S. Pat. No. 8,561,965 on Oct. 22, 2013, which is a 371 U.S. national phase application of International Application No. PCT/US2008/073868, which was filed on Aug. 21, 2008, which is a non-provisional application of U.S. Provisional Application No. 60/957,362, filed on Aug. 22, 2007.

FIELD OF THE INVENTION

This invention generally relates to valves that connect fuel cartridges to various fuel cells and fuel refilling devices. More particularly, this invention relates to non-interchangeable connecting valves comprising at least one fixedly attached center post and at least one internal elastomeric seal, which opens when compressed by a tube having predetermined size and dimensions.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$) at a first pressure and temperature and released to fuel a fuel cell at a second pressure and temperature.

Most hydrogen fuel cells have a proton exchange membrane or polymer electrolyte membrane (PEM), which allows the hydrogen's protons to pass through but forces the electrons to pass through an external circuit, which advantageously can be a cell phone, a personal digital assistant (PDA), a computer, a power tool or any device that uses electron flow or electrical current. The fuel cell reaction can be represented as follows:

Half-reaction at the anode of the fuel cell:

$$H_2 \rightarrow 2H^+ + 2e^-$$

Half-reaction at the cathode of the fuel cell:

$$2(2H^+ + 2e^-) + O_2 \rightarrow 2H_2O$$

Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

DMFCs are discussed in U.S. Pat. Nos. 4,390,603 and 4,828,941, which are incorporated by reference herein in their entireties.

In a chemical metal hydride fuel cell, sodium borohydride is reformed and reacts as follows:

$$NaBH_4 + 2H_2O \rightarrow (\text{heat and/or catalyst}) \rightarrow 4(H_2) + (NaBO_2)$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product, illustrated above. Sodium borate ($NaBO_2$) by-product is also produced by the reforming process. A sodium borohydride fuel cell is discussed in U.S. Pat. No. 4,261,956, which is incorporated by reference herein in its entirety.

Valves are needed for transporting fuel between fuel cartridges, fuel cells and/or fuel refilling devices. The known art discloses various valves and flow control devices such as those described in U.S. Pat. Nos. 6,506,513 and 5,723,229 and in U.S. published application nos. 2003/0082427 and 2002/0197522. A need, however, exists for improved valves that allow venting of gas, maintaining seals, improving the flow of fuel through the valve, among other things. To a certain extent, this need for improved connecting valves for fuel cartridges has been addressed by commonly owned, co-pending U.S. published application nos. 2005/0022883 and 2006/0196562 as well as U.S. patent application Ser. No. 10/978,949, which are incorporated herein by reference in their entireties. Nonetheless, there still exists the need for connecting valves that cannot be readily opened. Some of the inventive valves described herewithin were described in commonly-owned, co-pending U.S. provisional application Ser. No. 60/957,362 filed on Aug. 22, 2007. The '362 is incorporated herein by reference in its entirety.

SUMMARY OF THE INVENTION

The inventive valve is usable with fuel supplies or cartridges containing fuel for fuel cells and comprises two valve components. The first valve component is normally sealed and the second valve component has a hollow tube designed to enter the first valve component to move or compress a sealing member in the first valve component to establish a flow path through both valve components. The first valve has a relatively immovable center post that protects the sealing member by limiting access thereto. One advantage of the inventive valve is that the hollow tube needs to have predetermined size and shape in order to pass by the center post to reach the sealing member In some embodiments, the second valve component also has a sealing member and during connection, this sealing member is also moved or compressed to open the second valve member. The sealing member can be made from suitable elastomeric materials, and can have the shape of an O-ring or a washer of various dimensions among others. The hollow tube is preferably cylindrical, but can have non-circular cross-sections. Optionally, the hollow tube has non-standard size and shape, i.e., not easily found in common household goods and other objects, to further limit access to the sealing member.

BRIEF DESCRIPTION OF THE DRAWINGS

In the accompanying drawings, which form a part of the specification and are to be read in conjunction therewith and in which like reference numerals are used to indicate like parts in the various views:

FIG. 5 is an enlarged partial view of the fuel supply of FIG. 4 showing the valve connecting the pressurized chamber of the fuel supply to the pressure regulator;

FIG. 6 is an enlarged partial view of the fuel supply of FIG. 4 showing the valve connecting the fuel supply to the fuel cell or the device that the fuel cell powers;

FIGS. 9a-9c are cross-sectional views of another exemplary valve according to the present invention showing the opening sequence from closed in FIG. 9a to engaged and open in FIG. 9b-c, and FIG. 9d is an exploded perspective view of the valve;

FIGS. 10a-10c are cross-sectional views of another exemplary valve according to the present invention showing the opening sequence from closed in FIG. 10a to engaged and closed in FIG. 10b to open in FIG. 10c, and FIG. 10d is an exploded perspective view of the valve;

FIGS. 11a-11c are cross-sectional views of another exemplary valve according to the present invention showing the opening sequence from closed in FIG. 11a to engaged and closed in FIG. 11b to open in FIG. 11c, and FIG. 11d is an exploded perspective view of the valve;

FIG. 12a is a cross-sectional view of an exemplary valve component according to the present invention, and FIG. 12b is an exploded perspective view of the valve component;

FIG. 13a is a cross-sectional view of another exemplary valve component according to the present invention, and FIG. 13b is an exploded perspective view of the valve component;

FIGS. 14a-c are cross-sectional views of another exemplary valve showing the opening sequence of the valve and FIG. 14d is an exploded perspective view of the valve; and FIG. 15a is an exploded cross-sectional view of another exemplary valve and FIG. 15b is an exploded view of the valve.

DETAILED DESCRIPTION OF THE INVENTION

Figure 1:
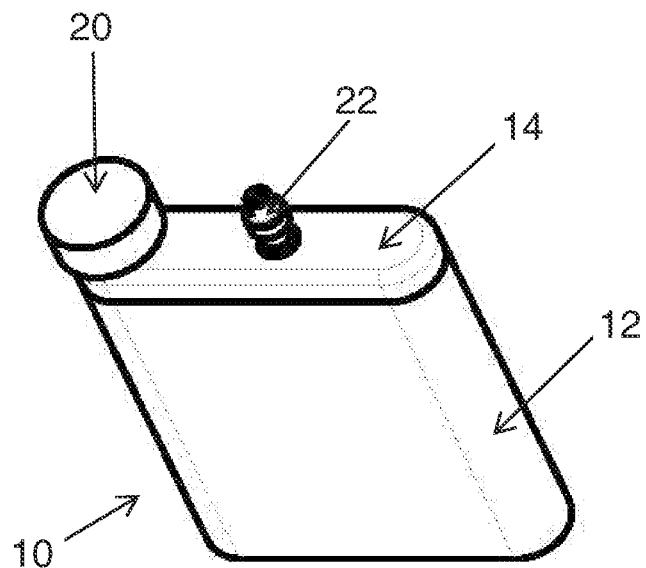
FIG. 1 is a front perspective view of a fuel supply in accordance with the present invention showing components from a fuel cell or a device that the fuel cell powers.
Figure 2:
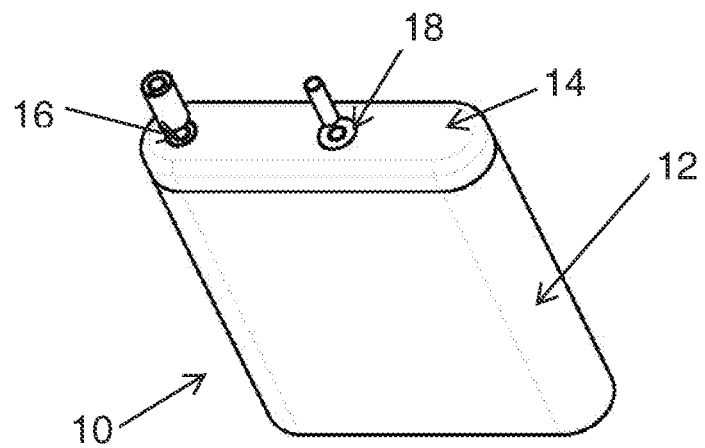
FIG. 2 is a front perspective view of the fuel supply of FIG. 1 without the device side components but with connecting tubes adapted to open the fuel supply's valves.

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated by reference herein in their entirety. Methanol and other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. Pat. App. Pub. No. US 2003/0077493, entitled "Method of Using Fuel Cell System Configured to Provide Power to One or More Loads," published on Apr. 24, 2003, which is incorporated by reference herein in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497 and 6,758,871, which are incorporated by reference herein in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. Pat. Appl. Pub. No. US 2002/0076602. Suitable fuels are also disclosed in co-owned, co-pending U.S. Pat. Appl. No. 60/689,572, entitled "Fuels for Hydrogen-Generating Cartridges," filed on Jun. 13, 2005. These references are also incorporated by reference herein in their entireties.

Fuels can also include a chemical hydride such as sodium borohydride ($NaBH_4$) and an activator such as water, discussed above, or metal hydrides that absorb and adsorb hydrogen within the hydride's matrix at a certain temperature and pressure and release hydrogen to fuel the fuel cells at another temperature and pressure. Suitable metal hydrides, including but not limited to lanthanum pentanickel ($LaNi_5$) and the metal hydrides disclosed in commonly-owned U.S. provisional application Ser. No. 60/782,632 filed no Mar. 15, 2006, which is incorporated herein by reference in its entirety.

Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels. The present invention is therefore not limited to any type of fuels, activators, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals including additives and catalysts and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engines built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Referring to FIGS. 1-4, fuel supply 10 is shown. Fuel supply 10 can have any convenient shape, including but not limited to the shape shown. Fuel supply 10 has outer casing 12, lid 14, first valve 16 and second valve 18. Lid 14 is fitted to outer casing 12, and is sealed thereto by O-ring 13. Sealing can also be accomplished by adhesives or ultrasonic welding. First valve 16 is sized and dimensioned to mate with a pressure regulator 20 and second valve 18 is sized and dimensioned to mate with device valve 22. In one embodiment, fuel supply 10 is disposable and more preferably recyclable. More particularly, outer casing 12 is recyclable or reusable, and inner liner 28 and/or lid 14 are disposable. Pressure regulator 20 and device valve 22 are preferably reusable, and are connected to or are parts of the fuel cell or the device that the fuel cell powers to save costs.

Figure 3:
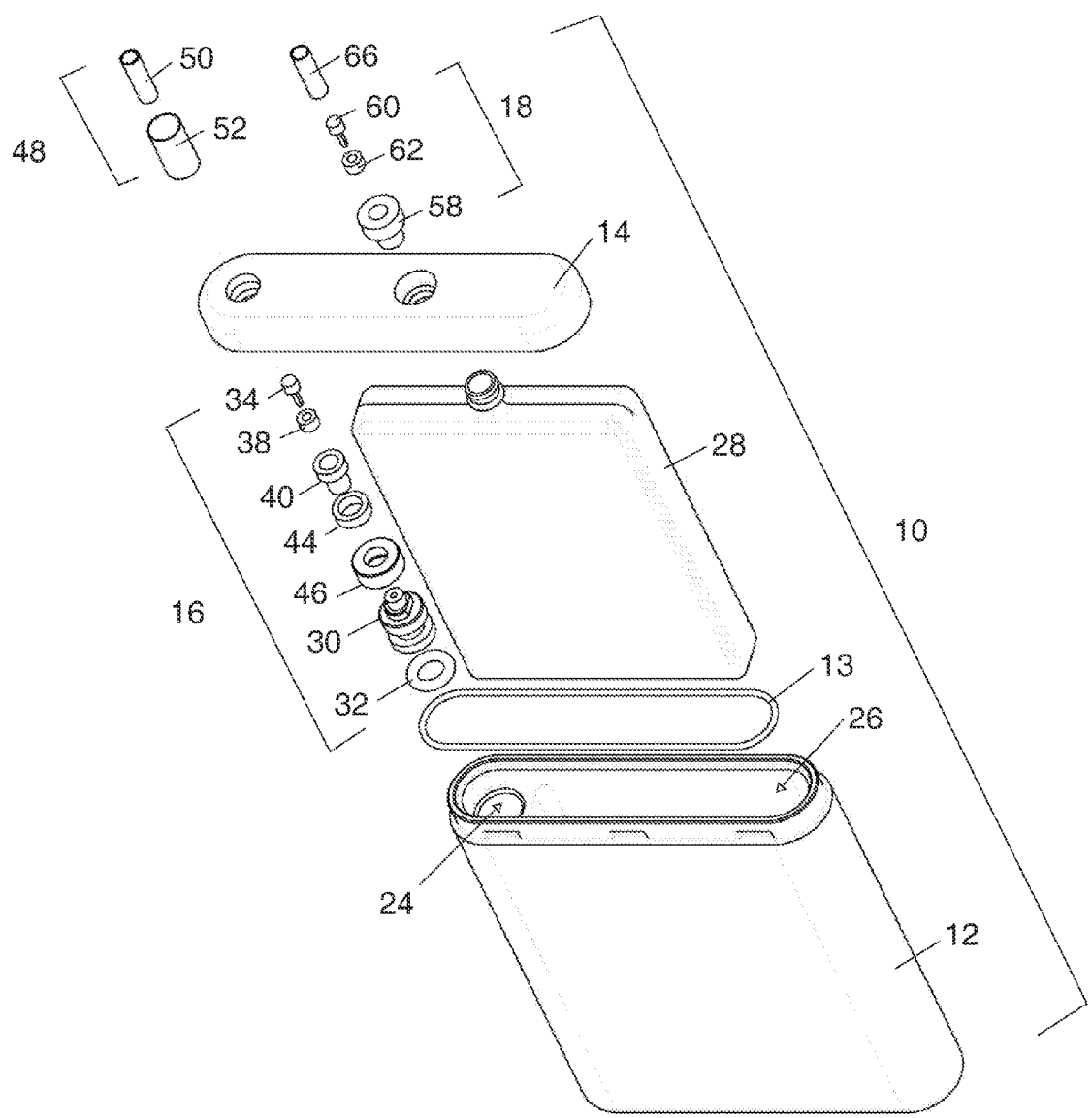
FIG. 3 is an exploded perspective view of the fuel supply of FIG. 2.
Figure 4:
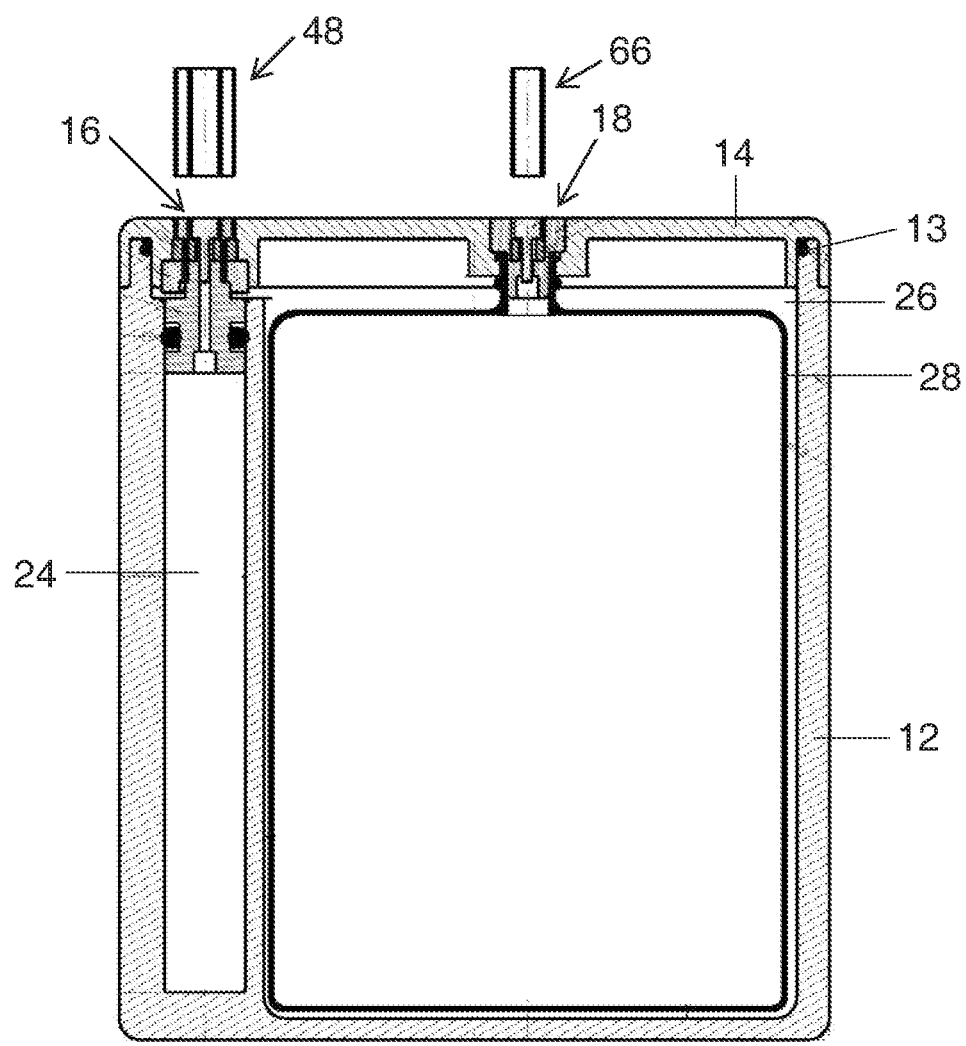
FIG. 4 is a cross-sectional and partial exploded view of the fuel supply of FIG. 2.

Referring to FIGS. 3-5, where the internal components are shown in detail, fuel supply 10 has compressed gas chamber 24 and liquid fuel chamber 26, where liquid fuel is kept inside liner 28. As discussed above, liquid fuel can be a fuel that is used directly by a fuel cell, such as methanol and ethanol. Liquid fuel can also be a liquid reactant that hydrolyzes in a reaction chamber to produce hydrogen that powers the fuel cell, such as water or other activators to react with solid metal hydride to form hydrogen fuel.

First valve 16 allows compressed gas to exit pressurized or compressed gas chamber 24 of fuel supply 10 to enter pressure regulator 20, and then communicate the reduced pressure gas back into fuel supply 10 and to liquid fuel chamber 26 to apply pressure on liner 28. First valve 16 comprises valve body 30, which is fitted to the side walls of compressed gas chamber 24 and is sealed thereto with O-ring 32. Inner center post 34 is fixedly attached valve body 30, e.g., interference fit, so that there is substantially no relative movement between inner center post 34 and valve body 30. A flow channel 36 is defined between the stem of inner center post 34 and valve body 30. In one example, the stem has a cylindrical shape and a portion of stem is filed down to form a flat surface. Inner flow channel 36 is formed between the flat surface and valve body 30, as best shown in FIGS. 3 and 5. Inner elastomeric seal 38 is disposed between the head of inner center post 34 and the top of valve body 30, as shown, to provide a seal for inner flow channel 36. First valve 16 also has outer center post 40, which is disposed annularly around inner center post 34, leaving a space therebetween as shown. Outer center post 40 is also fixedly attached to valve body 30, e.g., interference fit, so that there is substantially no relative movement between outer center post 40 and valve body 30. Outer flow channel 42 is defined around the outside of outer center post 40 to allow the reduced pressure gas from pressure regulator 20 to re-enter fuel supply 10. Within fuel supply 10 outer flow channel 42 is re-directed to liquid fuel chamber 26, as best shown in FIG. 5. Outer elastomeric seal 44 provides a seal for outer flow channel 42 and is positioned below the head of outer center post 40 and optional cap 46. Cap 46 can be omitted and valve body 30 can be extended upward to meet outer elastomeric seal 44, or elastomeric seal 44 can be extended downward to meet valve body 30.

While inner flow channel 36 is shown to be inside of outer flow channel 42, these two flow channels can be arranged in the reverse order, or side-by-side. Flow paths 36 and 42 can also be in opposite directions, as indicated by the discussion above and FIG. 5.

As shown in FIGS. 3 and 5, first valve 16 is closed or sealed. To open first valve 16, tube 48 is pushed into first valve 16. Tube 48 comprises inner tube 50 and outer tube 52. These tubes can be connected to each other to maintain their relative positions, for example by spokes or webs (not shown). Inner tube 50 is sized and dimensioned to fit in space 54 between inner center post 34 and outer center post 40, and outer tube 52 is sized and dimensioned to fit in space 56 between outer center post 40 and lid 14. Inner tube 50 compresses inner elastomeric seal 38 to open flow path 36 and outer tube 52 compresses outer elastomeric seal 44 to open flow path 42. Compressed gas exits fuel supply 10 through flow path 36 and reduced pressure gas re-enters fuel supply through flow path 42 to pressurize liquid fuel.

In an innovative aspect of the present invention, because first valve 16 comprises center posts 34, 40, it is not interchangeable. In particular, valve 16 opens only after a tube 48 with the correct diameter is inserted in the annular space around center posts 34, 40 to compress elastomeric seals 38, 44. Center posts 34, 40 are designed to prevent larger or smaller diameter foreign objects (e.g., pens, pencils, paper clips, fingers, and the like) from opening the valve. Center posts 34 and 40 may be attached to valve body 30 by various methods, such as snap fitting, adhesive, ultrasonic welding, etc., so long as relative motions between the posts and the valve body are limited. Preferably, center posts 34, 40 can be assembled after or during the filling operation. Consequently, the flow of fuel into the cartridge will be faster and less restricted than in other designs.

Second valve 18 is similar to first valve 16, except that it is only configured to allow liquid fuel to exit fuel supply 10. Second valve 18 comprises valve body 58 and center post 60, which is substantially similar to inner center post 34 of first valve 18, described above. Elastomeric seal 62 seals second valve 18 and flow channel 64 is defined between inner post 60 and valve body 58. Liner 28 is sealingly connected to valve body 58. Tube 66 is sized and dimensioned to enter space 68 in second valve 18 to compress elastomeric seal 62 to open second valve 18 to let the liquid fuel urged by pressurized gas from flow channel 64 to leave fuel supply 10.

Optionally, tubes 48 or 66 have non-standard sizes. In other words, their dimensions are different than the dimensions of items commonly found in the homes or offices, so that it is more difficult to unintentionally compress sealing members 38, 44 or 62. Alternatively, tubes 48 or 66 should have non circular or polygonal (regular or irregular) cross-sections. Of course, center posts 34, 40 or 60 should have matching shapes in order to receive the tubes.

Figure 8:
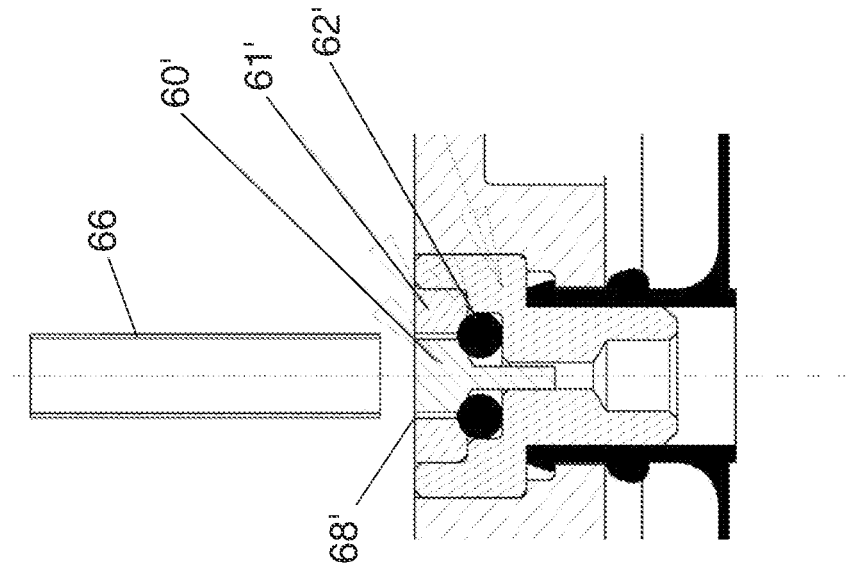
FIGS. 7 and 8 show an alternatively embodiment of the valves of FIGS. 5 and 6.
Figure 7:
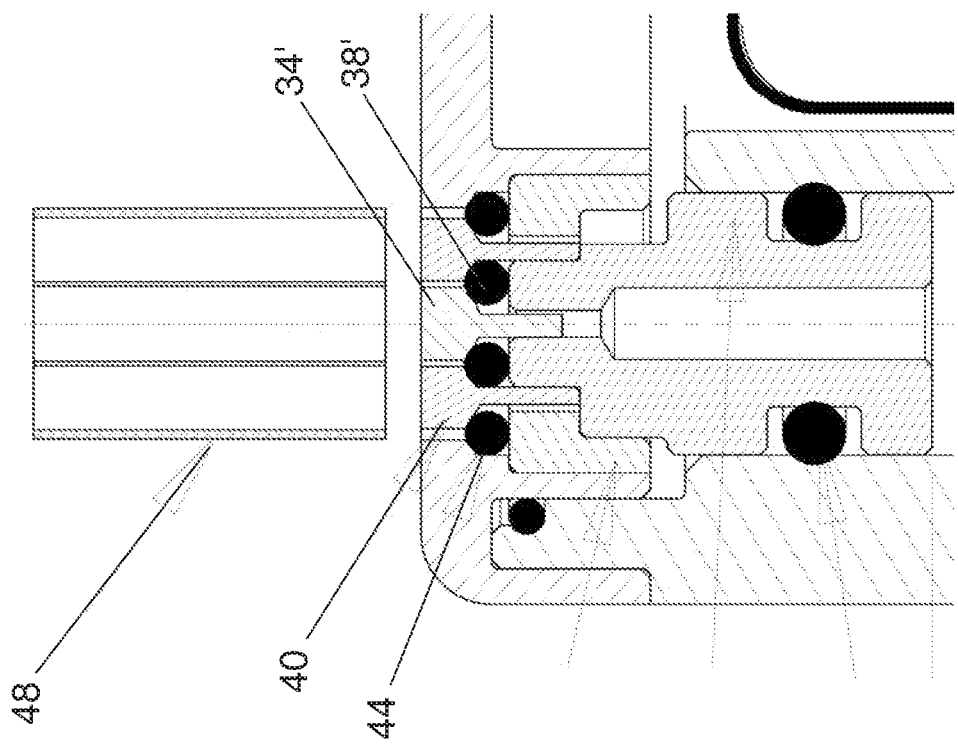

In an alternative embodiment shown in FIGS. 7-8, elastomeric seals 38, 44 and 62 are replaced by O-rings 38', 44' and 62' or other sealing members such as washers, overmolded elastomeric portions, elastomeric balls, and the like. Center posts 34' and 40' are modified to provide angular seating surfaces to seal with the 0-rings. Center post 60' in this embodiment has outer ring 61' to provide spacing 68' for tube 66 to enter to open second valve 18.

As illustrated in FIGS. 5-8 as well as the other drawings, the top surface of valves 16 and 18 facing tubes 48 and 66 can also be termed the mating surface.

In other alternative embodiments, first valve 16 or second valve 18 can have a sealing member 70 (e.g., an O-ring, a sealing face, a washer, an overmolded elastomeric portion, an elastomeric ball or the like) located near the entrance of either valve. For example, as shown in FIGS. 9(*a*)-9(*c*) and FIGS. 10(*a*)-10(*c*), sealing member 70 can be an O-ring residing in grooves defined within a valve body 58 of second valve 18. The seal is provided between valve body 58, sealing member 70 and center post 60. Space 68 is provided between valve body 58 and center post 60. In this embodiment, tube 66 is sized and dimensioned to be larger than center post 60, and when tube 66 is inserted into space 68 it pushes O-ring 70 outward to allow a flow channel 64 between tube 66 and center post 60, as shown in FIGS. 9(*b*) and 9(*c*). Further insertion of tube 66, shown in FIG. 9(*c*), ensures stability of tube 66 inside valve body 58. When tube 66 is first inserted into space 68 as shown in FIG. 9(*b*), an inter-component seal is optionally formed between tube 66 and valve body 58. FIG. 9(*d*) shows an exploded view of valve 18 and tube 66.

The embodiment of FIGS. 10(*a*)-(*d*) is similar to the embodiment of FIGS. 9(*a*)-(*d*), except that in addition to the seal provided by O-ring 70, a second seal is provided by elastomeric seal 62 and center post 70. Here, when tube 66 pushes O-ring 70 aside, valve 18 remains sealed, as shown in FIG. 10(*b*), until tube 66 compresses elastomeric seal 62, as shown in FIG. 10(*c*) to establish flow path 64. FIG. 10(*d*) shows an exploded view of mating tube 66 and valve 18.

Although the sequence in FIGS. 9(*a*)-9(*c*) and FIGS. 10(*a*)-10(*c*) is shown for valve 18, a comparable sequence could be applied to form an inter-component seal between tube 48 and valve 16 and thereafter open internal seals within valve 16.

The closing sequence of either valve 16 or valve 18 is similar to the reverse process of the above-described opening sequence. Cartridge 10 is first disengaged from a device, either manually or automatically using any ejection mechanism known in the art, and any compressed seal (e.g., elastomeric seals 38, 44 and 62, O-rings 38', 44' and 62', or sealing member 70) releases its stored energy and returns to its original position. Advantageously, in one particular embodiment, the compressed seal itself can act as the ejection mechanism. As a consequence, no external spring force is necessary to eject cartridge 10 and one conserves space within cartridge 10. After the cartridge is ejected and the elastomeric seals return to their original position, a center post once again engages with the elastomeric seals to close off flow paths to the fuel cartridge.

FIGS. 11(*a*)-(*d*) illustrate another embodiment of the present invention. As shown, a connecting valve 72 comprising two valve components 74 and 76. One valve component is mated to either a fuel supply or a device (e.g., a fuel cell, refilling device, or any other device suitable for use in a fuel cell system), and another valve component is mated to the other of the fuel supply or device. Preferably, a first valve component 74 is mated to a device, and a second valve component 76 is preferably mated to a fuel supply. FIGS. 11(*a*)-11(*c*) show a sequence depicting the connection of first valve component 74 and second valve component 76 and the opening of internal seals therein, and FIG. 11(*d*) shows an exploded view of connecting valve 72.

First valve component 74 comprises a housing with a top portion 77a and a bottom portion 77b. The top portion 77a encases a hose tube 78 that connects fluidly with an O-ring 80. The O-ring 80 forms an internal seal with center post 81, which is shown as being integrally made with top housing 77a. Inner tube 82, which has a pair of diametrically opposite apertures 84, is provided to selectively compress O-ring 80. The inner tube 82 is sized and dimensioned to fit within an outer tube 86. Tubes 82 and 86 are sized and dimensioned to define a space therebetween to be a part of a flow path. Both inner tube 82 and outer tube 86 are located within bottom portion 76b, and may be connected to each other by spokes or webs (not shown) to maintain their relative positions. When O-ring 80 is not compressed, it abuts with center post 81 to seal valve component 74. When it is compressed, a flow path through valve component 74 is established from hose tube 78 through compressed O-ring 80 into the hollow end of tube 82 and through aperture(s) 84 and though the space between inner tube 82 and outer tube 86.

The second valve component 76 also comprises several elements including a housing 88 with a top portion 88a and bottom portion 88b. Advantageously, a center post 90 is fixedly attached to bottom portion 88b and has angular seating surfaces that form an internal seal with an O-ring 92. The bottom portion 88b also has a hose tube 94 that connects fluidly to O-ring 92. Outer tube 86 of valve component 74 is also larger than center post 90 to allow fluid to flow therebetween.

Both the first valve component 74 and the second valve component 76 can be connected together by bolts 96 in channels 98. Furthermore, an O-ring (not shown) can be provided between first valve component 74 and second valve component 76 in order to facilitate an inter-component seal between the two valve components.

FIG. 11(*a*) shows first valve component 74 as being unconnected to second valve component 76. To connect the fuel supply to the fuel cell and to transport fuel from the fuel supply to the fuel cell, outer tube 86 from first valve component 74 is inserted into the space 100 around center post 90 in second valve component 76, as shown in FIG. 11(*b*), until it reaches O-ring 92. In FIG. 11(*c*), the internal seals in first valve component 74 and second valve component 76 are opened to establish flow path 101. The internal seal in the first valve component 74 opens when center post 90 pushes against inner tube 82, which in turn compresses O-ring 80. The internal seal in the second valve component 76 opens when outer tube 86 of first valve component 74 compresses O-ring 92. A flow path is established in second valve component 76 from hose tube 94 around compressed O-ring 92 and through the space between center post 90 and outer tube 86 of first valve component 74. As shown in FIG. 11(*c*), flow path 101 is a combination of the flow paths in first valve component 74 and in second valve component 76. Fuel may flow through flow path 101 in either direction from hose tube 78 to hose tube 94, and in reverse.

When establishing flow path 101, first valve component 74 can be opened simultaneously with second valve component 76, or the two valve components may be timed to open in a sequential manner after a connection is made between them. As will be recognized by those skilled in the art, in some situations advantage may be found in opening the flow path to the device prior to opening the flow path to cartridge 10, for example to ensure that the device is prepared to receive fluid or gas prior to accessing the fuel stored in cartridge 10. This sequential opening may be attained by simply adjusting the length of inner tube 82, outer tube 86, or center post 90. For example, if first valve component 74 is on the device, outer tube 86 may be shortened, or inner tube 82 or center post 90 may be lengthened. In such a case, center post 90 moves inner tube 82 prior to outer tube 86 engaging with O-ring 92. Alternatively, if second valve component 76 is on the device, outer tube 86 can be lengthened so that it compresses O-ring 92 prior to inner tube 82 engaging with center post 90. Any of these structures or combinations thereof may also result in one valve component having a longer stroke to open its flow path than the other valve component so that one valve component has a longer opening sequence than the other valve component.

Another version of first valve component 74' is shown in FIGS. 12(a) and 12(b). Here, the center post 81 is attached to housing 77a via an interference fit, and lower housing portion 77b is combined with outer tube 86. Inner tube 82 is allowed to move slightly up and down relative to lower housing 77b/outer tube 86 to compress and uncompress O-ring 80. The operation of this valve component 74' is similar to first valve component 74 described in FIGS. 11(a)-(d).

Another version of first valve component 74" is shown in FIGS. 13(a)-(b). Here, center post 81 is extended downward or outward and is fixed to first housing portion 77a by interference fit. A single tube 82/86 replaces inner tube 82 and outer tube 86 and is movable to compress O-ring 80, which provides a seal with center post 80 as described above. Tube 82/86 fits outside of center post 81 and provides a gap therebetween. Retainer ring 105 is designed to keep tube 82/86 within valve component 74" by interfering with outer ring 103 of tube 82/86. When O-ring 80 is compressed, a flow path is established from tube 78 around the small stem of center post 81 and around compressed O-ring 80 and into the space between tube 82/86 and center post 81. When connecting to second valve component 76, shown in FIGS. 11(a)-(d), tube 82/86 compresses O-ring 92 of second valve component 76, as well as O-ring 80 of first valve component 74, either simultaneously or in sequence as discussed above.

Referring to FIGS. 14(a)-(d), another version of valve 18 is shown. In this embodiment, center post 60 is made integral to valve body 58, but can be made separately and affixed to valve body 58 as discussed above and below in connection with FIGS. 15(a)-(b). Sealing member 62 in this case is a non-flat washer or a lip washer providing a lip seal with center post 60. As best shown in FIG. 14(a), lip washer 62 is retained between valve body 58 and retainer 107. The sealing portion of washer 62 is oriented inward and presses against center post 60, as shown, to provide the seal. In this embodiment, space 68 is provided between retainer 107 and center post 60, and is sized and dimensioned to receive tube 66. Also, a clearance is provided between tube 66 and center post 60 to allow fuel to flow therethrough. As shown in FIG. 14(b), tube 66 is inserted into valve component 18 through space 68 until it reaches lip washer 62 and beyond as shown in FIG. 14(c). Once tube 66 is pushed past lip washer 62, fuel flow path 64 is established as shown.

FIGS. 15(a)-(b) show a variation of the valve component of FIGS. 14(a)-(d). These two valve components are similar to each other except that washer 62 is a flat washer and center post 60 is made separate from valve body 58. Furthermore, valve body 58 has cut-out channel 109 formed therein to be a part of flow path 64.

Variations to fuel supply 10 are described in commonly-owned, co-pending U.S. provisional application Ser. No. 60/957,362 filed on Aug. 22, 2007. The '362 has been incorporated by reference in its entirety.

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. Additionally, components or features of one embodiment can be utilized in other embodiments.

The invention claimed is:

1. A valve comprising,
   a valve body, a sealing member and a center post affixed to the valve body such that the center post is substantially immovable relative to the valve body,
   wherein the sealing member is positioned away from a mating surface of the valve and a gap on the mating surface is provided, wherein the gap is defined between the center post and the valve body, wherein the gap is present when the valve is in a closed position,
   wherein the gap is sized and dimensioned to receive a hollow tube, and
   wherein when the hollow tube is pushed into the gap it moves the sealing member away from a sealing position to establish a flow path through the valve.

2. The valve of claim 1, wherein the center post is integral to the valve body.

3. The valve of claim 1, wherein the flow path comprises a path between the tube and the center post and between the center post and the valve body.

4. The valve of claim 1, wherein the sealing member is selected from the group consisting of O-rings, elastomeric seals, sealing faces, washers, overmolded elastomeric portions, flat O-rings, non-flat O-rings, lip washers and elastomeric balls.

5. The valve of claim 1, further comprising a second center post affixed to the valve body and a second sealing member positioned away from the mating surface,
   wherein a second space is provided around the second center post and
   wherein a second tube sized and dimensioned to enter the second space is provided to open a second flow path through the valve.

6. The valve of claim 5, wherein the second center post is located concentrically around the center post and the second space is positioned concentrically around the space.

7. The valve of claim 1, wherein the valve further comprises a second sealing member between the valve body and the center post, and wherein the hollow tube moves the second sealing member to establish the flow path.

8. The valve of claim 1, wherein the hollow tube is connected to a corresponding valve and wherein the corresponding valve further comprises a valve body, a sealing member and a center post affixed to the valve body such that the center post is substantially immovable relative to the valve body of the corresponding valve.

9. The valve of claim 8, wherein the hollow tube is integral with the valve body of the corresponding valve.

10. The valve of claim 8, wherein the hollow tube is movable relative to the valve body of the corresponding valve component to compress the sealing member of the corresponding valve to open a flow path through the corresponding valve.

11. The valve of claim 10, wherein the hollow tube comprises an outer protuberance adapted to engage a retainer.

12. The valve of claim 8, wherein the corresponding valve further comprises a second hollow tube, wherein the second hollow tube is movable relative to the valve body of the corresponding valve to compress the sealing member of the corresponding valve.

13. The valve of claim 12, wherein the second hollow tube is located concentrically around the hollow tube.

14. The valve of claim 13, wherein the hollow tube is fixedly attached to the valve body of the corresponding valve.

15. The valve of claim 12, wherein a support connects the hollow tube to the second hollow tube.

16. The valve of claim 15, wherein the support comprises a web or spoke.

17. The valve of claim 12, wherein at least one aperture is disposed on the side wall of the second hollow tube to provide a flow path therethrough.

18. The valve of claim 12, a pair of diametrically opposite apertures is disposed on the side wall of the second hollow tube to provide a flow path therethrough.

19. The valve of claim 12, wherein an inter-component seal is established between the in the valve and the corresponding valve.

20. The valve of claim 1, wherein the hollow tube is connected to a corresponding valve comprising an internal seal.

\* \* \* \* \*